United States Patent [19]

Rodewald et al.

[11] 4,401,293

[45] Aug. 30, 1983

[54] ARRANGEMENT OF FLUID PRESSURE PASSAGEWAYS IN CYLINDER DEVICES

[75] Inventors: Gerhard Rodewald, Ronnenberg; Detlef Opel, Haste; Walter Brausfeld, Hanover; Helmut Göttling, Isernhagen; Hans-Friedrich Meyer; Rudolf Möller, both of Gehrden, all of Fed. Rep. of Germany

[73] Assignee: WABCO Steuerungstechnik GmbH, Hanover, Fed. Rep. of Germany

[21] Appl. No.: 305,068

[22] Filed: Sep. 24, 1981

[30] Foreign Application Priority Data

Oct. 4, 1980 [DE] Fed. Rep. of Germany ....... 3037674

[51] Int. Cl.³ ............................................. F16K 27/00
[52] U.S. Cl. ............................. 251/324; 137/625.69; 251/367
[58] Field of Search ............ 137/625.69; 251/DIG. 1, 251/324, 367

[56] References Cited

U.S. PATENT DOCUMENTS 2,910,081 10/1959 Karbowniczek .................... 251/324
3,581,772 6/1971 Wills ................................ 137/625.69

Primary Examiner—Alan Cohan
Assistant Examiner—John A. Rivell
Attorney, Agent, or Firm—R. S. Visk

[57] ABSTRACT

An arrangement wherein fluid pressure passageways opening into inner chambers of a cylindrical housing of a valve device, are formed between abutting faces of two axially aligned cylindrical portions comprising the housing. The opening or passageway between the abutting faces is formed by complementarily engaging saw-like teeth formed around the annular abutting faces of the two housing portions. This arrangement provides a smoother surface over which the sealing gasket on a valve member must ride, thus resulting in less wear and tear on the gasket.

3 Claims, 1 Drawing Figure

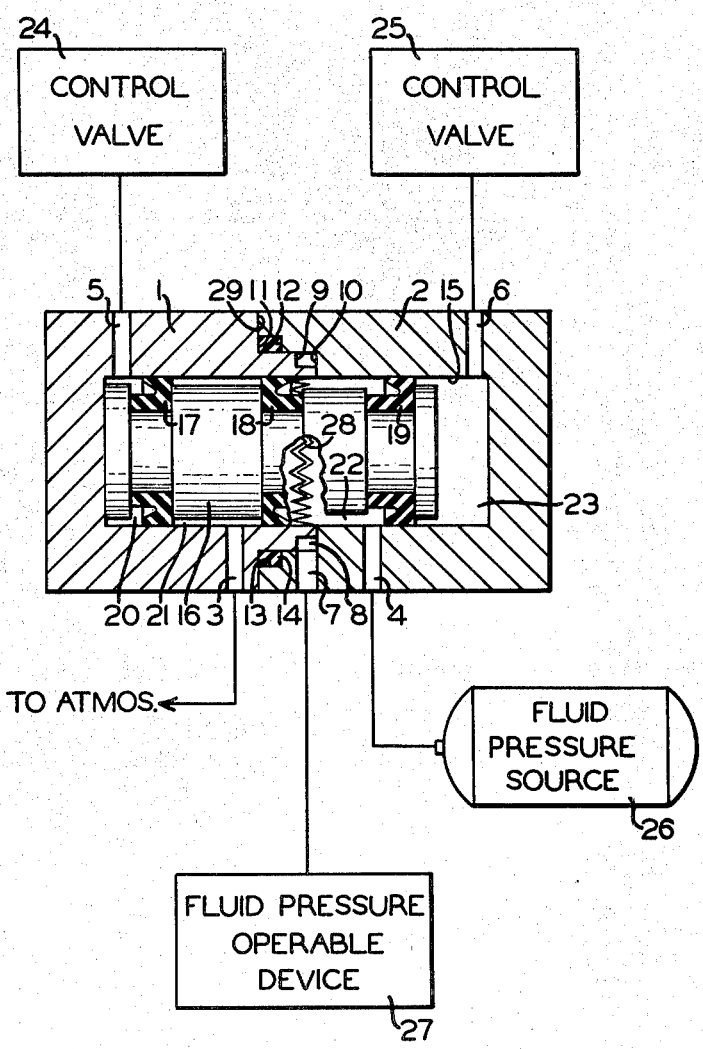

ARRANGEMENT OF FLUID PRESSURE PASSAGEWAYS IN CYLINDER DEVICES

BACKGROUND OF THE INVENTION

In the situation where a piston rides over discharge openings or passageways in a cylinder, for example, wherein said piston is provided with an elastic gasket which is fluid pressure medium, the problem is that said gasket may be extruded from the mounting groove and into the discharge passageway openings. This results in faster wearing of the gasket, leakage between the piston and the cylinder wall, and possible destruction of the gasket. To avoid this, it has been proposed that a housing casing be installed within the cylinder which has a number of small perforations in the area of the passageway openings. Such measures prevent the gaskets from being extruded into the discharge openings, but does not necessarily prevent damage to the gaskets.

The disadvantage of this proposal is that removing burrs and rounding-off the edges of the small perforations is a tedious and expensive process requiring much time, and there can be no assurance that some burrs will not remain to cause damage to the gasket.

SUMMARY OF THE INVENTION

Therefore, the object of the invention is to provide discharge openings for fluid pressure passageways arranged in a cylinder in such a way that extrusion of the gaskets into the discharge openings without precautionary measures is eliminated.

A special advantage is the ease of fabricating discharge openings designed according to the invention, and the protective characteristics of the gasket. Briefly, the invention comprises a discharge opening cooperatively formed on opposing abutting annular faces of respective halves of a cylinder or a cylindrical casing. A space is provided between serrated or wave-like complementary surfaces formed on non abutting surfaces. The dimension of the space between the complementary surfaces may be varied by the use of different sized spacers inserted between the two halves of the piston. The cylinder comprises two portions or halves in which the abutting front faces of the cylinder are complementary serrated near the area of the cylinder discharge openings, and in which an annular channel is provided in the cylinder wall. The annular channel is communicated with the cylinder openings via the serrated area of the abutting front faces of the cylinder.

The single FIGURE drawing is an axial sectional view of a flow valve device embodying the invention.

DESCRIPTION AND OPERATION

A flow valve device, as shown in the drawing, comprises a cylindrical valve housing consisting of two axially aligned cylindrical housing portions 1 and 2, in which four holes or passageways, serving a fluid pressure medium openings 3, 4, 5 and 6, have been provided. An additional drilling, which serves as a pressure or delivery opening 7, opens into an annular channel 8 formed, adjacent the abutting faces of valve housing portions 1 and 2, by shoulders 9 and 10 formed on said abutting faces of said portions 1 and 2, respectively. Two additional shoulders 11 and 12 integrated into the respective faces of both housing portions 1 and 2 form an additional annular groove 13, axially spaced away from groove 8, for the purpose of receiving a sealing element 14, which closes off the seam between the two pressure-proof housing portions 1 and 2.

Housing portions 1 and 2 are provided with a continuous coaxial bore 15 in which a spool-type valve member 16 is reciprocably disposed and acted upon each end thereof by fluid pressure. Valve member 16 is provided with three axially spaced annular grooves in which sealing elements 17, 18 and 19 are disposed. With the help of sealing bodies 17, 18 and 19, coaxial bore 15 is divided into four annular chambers 20, 21, 22 and 23, of which chambers 21 and 22 function as overflow channels. Chambers 20 and 23 serve as control chambers and are connected to respective pressure openings 5 and 6 which, in turn, are connected to control valve devices 24 and 25 shown symbolically in the drawing. From chamber 21, pressure discharge opening 3 leads to atmosphere. Pressure delivery opening 4, which is connected to a fluid pressure source 26, leads to chamber 22. A fluid pressure operable device 27 is connected to pressure delivery opening 7.

As hereinbefore mentioned, pressure medium discharge or delivery opening 7 is in communication with channel 8, which is formed by shoulders 9 and 10 of the opposing abutting faces of housing portions 1 and 2. The non abutting annular ends of housing portions 1 and 2 each has formed thereon a plurality of angularly disposed saw-like teeth complementarily engaged to form a zig-zag shaped discharge opening or passageway 28 between the facing ends of housing portions 1 and 2. The size of the gap between the teeth may be varied by inserting variously sized spacers between the peripheral abutting faces of housing portions 1 and 2, as indicated in the drawing at 29. If preferred, in place of the sawtooth configuration, a wave-like or other complementary configuration could be used in the described area. Of course it is also possible to use a single valve housing, instead of a partitioned one, in which a partitioned case can be installed. The function of the valve described above is explained in more detail as follows.

In the drawing, the chamber 23 connected to pressure opening 6, when charged with fluid pressure from control valve 25 (in a manner not deemed essential to an understanding of the invention) causes valve member 16 to be moved leftwardly to a left-end position. Pressure openings 4 and 7 are connected to each other via chamber 22, which serves as an overflow-channel. From the fluid pressure source 26, fluid pressure flows through pressure opening 4 into chamber 22, whence fluid pressure reaches channel 8 through the serrated discharge opening 28 and via pressure opening 7 to the fluid pressure operable device 27.

If fluid pressure operable device 27 is to be ventilated or deactivated, fluid pressure supply is diverted from pressure opening 6 to pressure opening 5. Now chamber 20, serving as a control chamber, is charged with fluid pressure to thereby cause valve member 16 to be moved to the right. In this shifting phase, the sealing element 18 rides over and past the serrated discharge opening 28 of housing portions 1 and 2. When the valve member 16 reaches a right-end position, fluid pressure discharge opening 3, which leads to atmosphere, is connected to pressure opening 7 via chamber 21, which serves as an overflow-channel, as well as to serrated discharge opening 28 via channel 8.

When valve member 16 shifts from one position to another, sealing element 18 rides over a non-damaging smooth surface formed by the zig-zag opening 28 between housing portions 1 and 2. The edges of the teeth making up zig-zag opening 28 may easily be dressed before the two housing portions 1 and 2 are assembled.

Having thus described the invention, what we claim as new and desire to secure by Letters Patent, is:

1. An arrangement of a fluid pressure opening connected with respective passageways in a cylindrical housing of a fluid pressure operable valve device, in which at least one sealing element disposed in a member movable in said housing relative thereto, is movable over said opening for connecting fluid pressure medium chambers, said arrangement comprising:
   (a) a pair of axially aligned cylindrical housing portions disposed in an end-to-end abutting relation to form said cylindrical housing and providing a coaxial bore in which said member carrying said sealing element is reciprocably movable;
   (b) a passageway formed cooperatively by two non abutting cylindrical housing portions to provide communication with the inner space of said housing;
   (c) said non abutting cylindrical housing portions having formed on the adjacent ends thereof; a plurality of axially extending interengaging saw-like teeth circumferentially positioned along a portion of said coaxial bore;
   (d) said passageway having a generally annular opening into said coaxial bore formed circumferentially in said coaxial bore intermediate respective pluralities of said saw-like teeth.

2. The arrangement according to claim 1, wherein the passageway comprises an axial space formed between pluralities of said saw-like teeth wherein said teeth are formed with arcuate sections in a wave-like pattern formed on each of said non abutting faces and complementarily engaging each other.

3. The arrangement according to claim 1, wherein said passageway is open to an annular channel of generally uniform radial cross-sectional areas at all points along the circumference of said passageway, said annular channel further surrounding the passageway and connecting with a fluid pressure operable device.

* * * * *